US011061182B2

United States Patent
Lu et al.

(10) Patent No.: US 11,061,182 B2
(45) Date of Patent: Jul. 13, 2021

(54) BACKLIGHT MODULE AND DISPLAY DEVICE

(71) Applicants: RADIANT OPTO-ELECTRONICS (SUZHOU) CO., LTD, Suzhou (CN); RADIANT OPTO-ELECTRONICS CORPORATION, Kaohsiung (TW)

(72) Inventors: Wei-Chung Lu, Kaohsiung (TW); Li-Hui Chen, Kaohsiung (TW); Kuan-Tun Chen, Kaohsiung (TW); Wei Yi, Kaohsiung (TW)

(73) Assignees: RADIANT OPTO-ELECTRONICS (SUZHOU) CO., LTD, Suzhou (CN); RADIANT OPTO-ELECTRONICS CORPORATION, Kaohsiung (TW)

(*) Notice: Subject to any disclaimer, the term of this patent is extended or adjusted under 35 U.S.C. 154(b) by 261 days.

(21) Appl. No.: 16/177,336

(22) Filed: Oct. 31, 2018

(65) Prior Publication Data
US 2019/0146143 A1    May 16, 2019

Related U.S. Application Data

(63) Continuation of application No. PCT/CN2017/111145, filed on Nov. 15, 2017.

(51) Int. Cl.
F21V 8/00    (2006.01)

(52) U.S. Cl.
CPC ......... G02B 6/0073 (2013.01); G02B 6/009 (2013.01); G02B 6/0051 (2013.01); G02B 6/0055 (2013.01); G02B 6/0088 (2013.01); G02B 6/0091 (2013.01)

(58) Field of Classification Search
CPC .. G02B 6/0073; G02B 6/0051; G02B 6/0055; G02B 6/0088; G02B 6/009; G02B 6/0091
See application file for complete search history.

(56) References Cited

U.S. PATENT DOCUMENTS 9,653,517 B2    5/2017 Uesaka et al.
9,703,034 B2    7/2017 Zhang
(Continued)

FOREIGN PATENT DOCUMENTS

CN    101194205 A  *  6/2008  ....... G02F 1/133603
CN    101194205 A       6/2008
(Continued)

OTHER PUBLICATIONS

Taiwan Patent Office, Office Action, Patent Application Serial No. 106141842, dated Mar. 26, 2018, Taiwan.
(Continued)

Primary Examiner — Rajarshi Chakraborty
Assistant Examiner — Fatima N Farokhrooz
(74) Attorney, Agent, or Firm — Muncy, Geissler, Olds & Lowe, P.C.

(57) ABSTRACT

A backlight module is provided, including a light guide plate, an optical film, and a light source module. The optical film is disposed on the light guide plate and has an accommodating space. The light source module has at least one light-emitting surface, which can be divided into a light-emitting area and a frame area. The light-emitting area faces the light guide plate, and at least a portion of the frame area enters the accommodating space.

15 Claims, 3 Drawing Sheets

(56) References Cited

U.S. PATENT DOCUMENTS

| | | | | |
|---|---|---|---|---|
| 2006/0279216 A1* | 12/2006 | Kim | ............... | G02B 6/0055 |
| | | | | 313/631 |
| 2009/0262276 A1* | 10/2009 | Jeong | ............... | G02B 6/0085 |
| | | | | 349/58 |
| 2011/0051045 A1* | 3/2011 | Hur | ............... | G02B 6/008 |
| | | | | 349/65 |
| 2011/0141162 A1* | 6/2011 | Seo | ............... | G02B 6/0046 |
| | | | | 345/690 |
| 2013/0155351 A1* | 6/2013 | Garelli | ............... | G02B 6/001 |
| | | | | 349/64 |
| 2017/0045666 A1* | 2/2017 | Vasylyev | ............... | G02B 6/0018 |
| 2019/0019445 A1* | 1/2019 | Xu | ............... | G02B 6/0031 |
| 2019/0369324 A1* | 12/2019 | Ma | ............... | G02B 6/0088 |

FOREIGN PATENT DOCUMENTS

| | | | | | |
|---|---|---|---|---|---|
| CN | 104375233 | A | | 2/2015 | |
| CN | 104456310 | A | * | 3/2015 | ....... G02F 1/133603 |
| CN | 104456310 | A | | 3/2015 | |
| CN | 104914618 | A | | 9/2015 | |
| CN | 106412162 | A | | 2/2017 | |
| CN | 207366898 | U | | 5/2018 | |
| TW | 201426090 | A | | 7/2014 | |
| TW | 201643525 | A | | 12/2016 | |
| TW | M545270 | | | 7/2017 | |

OTHER PUBLICATIONS

China Patent Office, International Search Report, Application No. PCT/CN2017/111145, dated Aug. 21, 2018, China.

\* cited by examiner

BACKLIGHT MODULE AND DISPLAY DEVICE

CROSS REFERENCE TO RELATED APPLICATIONS

This application is a continuation application of International Application No. PCT/CN2017/111145, filed Nov. 15, 2017, the entirety of which is incorporated by reference herein.

BACKGROUND OF THE INVENTION

Field of the Invention

The application relates in general to a backlight module, and in particular, to a backlight module having an optical film.

Description of the Related Art

A backlight module (BLM) is an important part of a thin-film transistor liquid-crystal display (TFT-LCD). The backlight module can provide uniform light of high brightness, and the thin-film transistor liquid-crystal display can display images.

A backlight module usually includes an optical film (such as a diffusion film) and a tape to attach the optical film to a frame. However, this increases the thickness of the backlight, and as such it is hard to make the product thin. Thus, how to address the aforementioned problem has become an important issue.

BRIEF SUMMARY OF INVENTION

To address the deficiencies of conventional products, an embodiment of the invention provides a backlight module, including a light guide plate, an optical film, and a light source module. The optical film is disposed on the light guide plate and has an accommodating space. The light source module has at least one light-emitting surface, which can be divided into a light-emitting area and a frame area. The light-emitting area faces the light guide plate, and at least a portion of the frame area enters the accommodating space.

In some embodiments, the accommodating space extends from the top surface to the bottom surface of the optical film.

In some embodiments, the light source module has a plurality of light-emitting diodes, each of the light-emitting diodes has a light-emitting surface, and the top surfaces of the frame areas of the light-emitting surfaces are aligned with the top surface of the optical film.

In some embodiments, the accommodating space is a depression on the bottom surface of the optical film, and does not extend to the top surface thereof.

In some embodiments, the light source module has a plurality of light-emitting diodes, each of the light-emitting diodes has a light-emitting surface, and the top surfaces of the frame areas of the light-emitting surfaces contact the bottom surface of the accommodating space.

In some embodiments, the light source module has a plurality of light-emitting diodes, and the optical film has a plurality of accommodating spaces at intervals, wherein the accommodating spaces correspond to the light-emitting diodes.

In some embodiments, the accommodating space of the optical film comprises a longitudinal slot, and the light source module is accommodated in the longitudinal slot.

In some embodiments, the light-emitting area is disposed in the projection of the light guiding plate on the light-emitting surface.

In some embodiments, the light source module comprises a circuit board and a plurality of light-emitting diodes, the light-emitting diodes are disposed on the circuit board, and each of the light-emitting diodes has a light-emitting surface.

In some embodiments, the light source module further comprises a circuit board, a plurality of light-emitting chips, a package structure, and a housing, and the package structure covers the light-emitting chips to package the same on the circuit board, wherein the package structure comprises the light-emitting area of the light-emitting surface, a long top side surface, and a long bottom side surface, the housing comprises the frame area of the light-emitting surface, and the frame area covers the long top side surface.

In some embodiments, the backlight module further comprises a reflective film, and the light guiding plate and the light source module are disposed on the reflective film.

In some embodiments, the backlight module further comprises a frame surrounding the reflective film, and the optical film is supported by the frame.

In some embodiments, the top surface of the frame is aligned with the top surface of the light guiding plate.

An embodiment of the invention further provides a display device, including the aforementioned backlight module, an adhesive member, and a display panel. The adhesive member is disposed on the light source module. The display panel is disposed on the adhesive member, and the optical film is disposed between the display panel and the light guiding plate.

In some embodiments, the optical film is a diffusion film.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the backlight module and the display device having the backlight module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
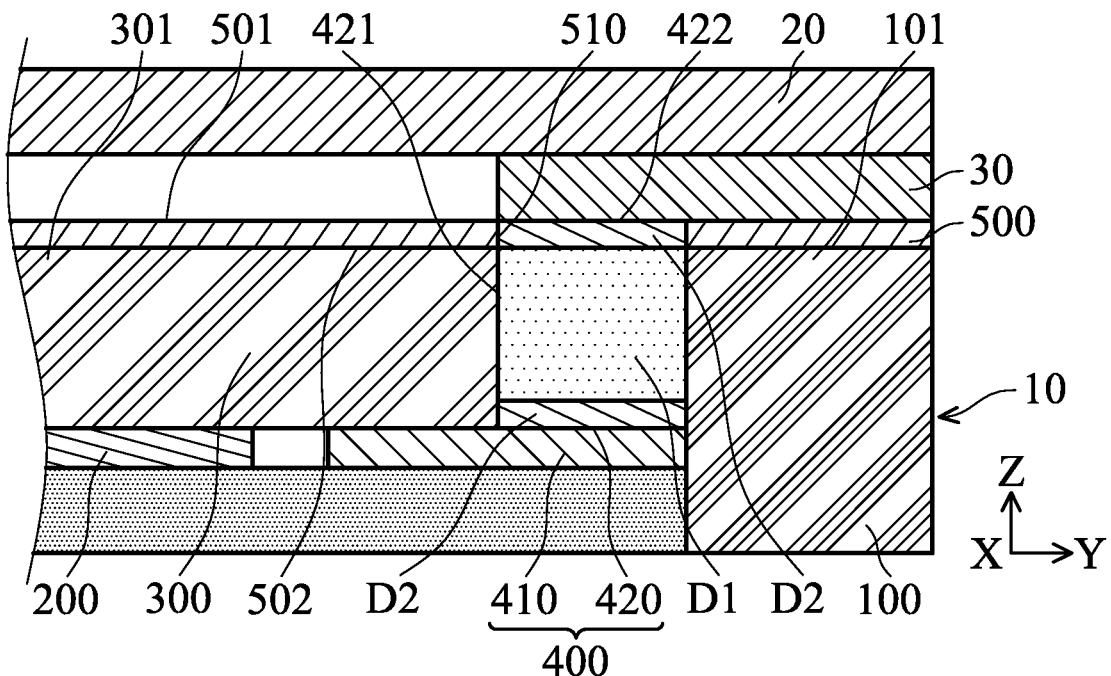
FIG. 1 is a schematic diagram of a display device according to an embodiment of the invention.

Referring to FIG. 1, a display device in an embodiment of the invention comprises a backlight module 10, a display panel 20, and an adhesive member 30. The backlight module 10 and the display panel 20 are disposed on the opposite surfaces of the adhesive member 30, and the display panel 20 can be affixed to the backlight module 10 via the adhesive member 30. It should be noted that the adhesive member 30 is merely disposed in a position adjacent to the side of the display device. Therefore, the light from the backlight module 10 can pass through the region that is not covered by the adhesive member 30 and can reach the display panel 20. For example, the display device can be a television, a computer screen, a home appliance monitor, a wearable device, a car screen, a mobile phone, or a tablet.

The backlight module 10 primarily comprises a frame 100, a reflective film 200, a light guiding plate 300, a light source module 400, and an optical film 500, wherein the reflective film 200, the light guiding plate 300, and the light source module 400 are surrounded by the frame 100. The light guiding plate 300 and the light source module 400 are disposed on the reflective film 200. The light guiding plate 300 is disposed between the optical film 500 and the reflective film 200, and the optical film 500 is disposed between the display panel 20 and the light guiding plate 300. For example, the optical film 500 can be a diffusion film.

The optical film 500 has at least one accommodating space 510 extended from the top surface 501 to the bottom surface 502 of the optical film 500, and the light source module 400 enters the accommodating space 510. Since the lengths of the accommodating space 510 along the X-axis and the Y-axis are substantially the same as the lengths of the light source module 400 along the X-axis and the Y-axis, the optical film 500 can be positioned after entering the accommodating space 510. Therefore, the optical film 500 will not slide along the X-axis and the Y-axis.

Figure 2:
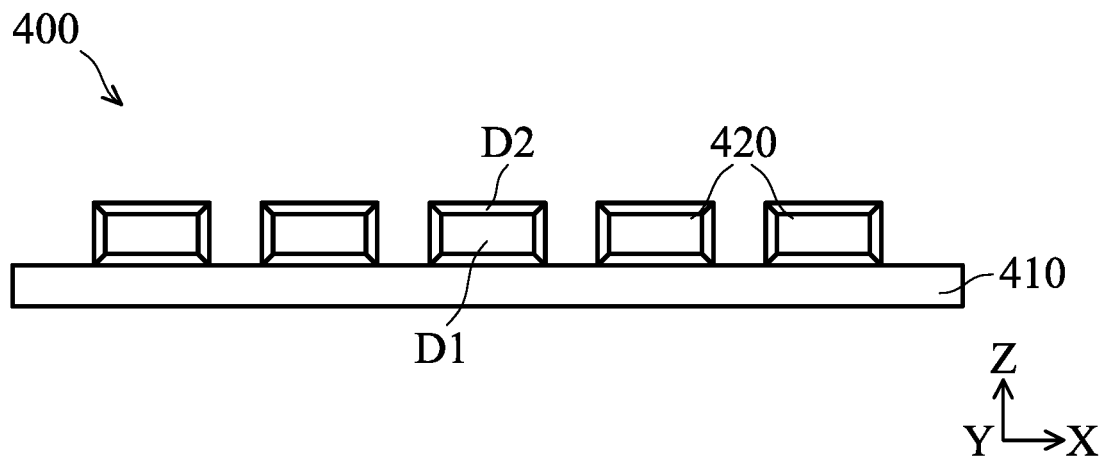
FIG. 2 is a schematic diagram of a light source module according to an embodiment of the invention.
Figure 3:
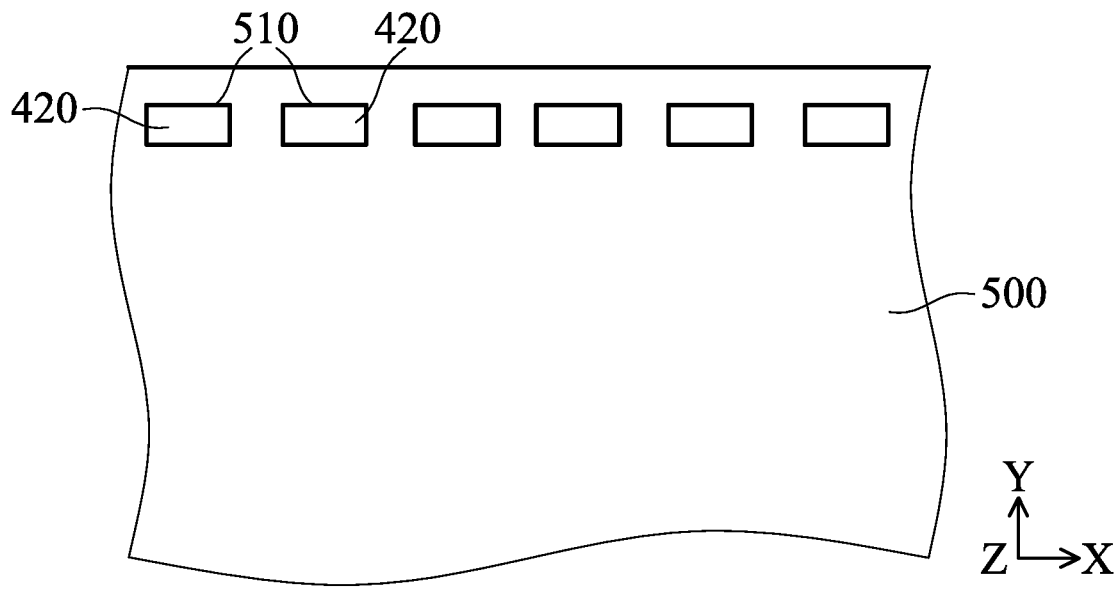
FIG. 3 is a schematic diagram of the light-emitting diodes of the light source module accommodated in the accommodating spaces of the optical film according to an embodiment of the invention.

As shown in FIGS. 1-3, in this embodiment, the light source module 400 comprises a circuit board 410 and a plurality of light-emitting diodes 420, and the optical film 500 has a plurality of accommodating spaces 510 at intervals. The light-emitting diodes 420 are disposed on the circuit board 410 at equal intervals, and enter the accommodating spaces 510 of the optical film 500 one-on-one. Furthermore, each of the light-emitting diodes 420 has a light-emitting surface 421 facing the light guiding plate 300.

Each of the light-emitting surfaces 421 can be divided into a light-emitting area D1 and a frame area D2. The light-emitting diode 420 emits light only from the light-emitting area D1, and the frame area D2 surrounds the light-emitting area D1. When the light-emitting diode 420 enters the accommodating space 510 of the optical film 500, at least a portion of the frame area D2 enters the accommodating space 510. The light-emitting area D1 does not enter the accommodating space 510, in other words, the light-emitting area D1 is in the projection of the light guiding plate 300 on the light-emitting surface 421. Therefore, the waste of the light can be efficiently reduced.

As shown in FIG. 1, in this embodiment, the top surface 101 of the frame 100 is substantially aligned with the top surface 301 of the light guiding plate 300, and a top surfaces 422 of the frame areas D2 of the light-emitting diodes 420 are aligned with the top surface 501 of the optical film 500. Thus, the optical film 500 can be smoothly disposed on the light guiding plate 300 and the frame 100, and the adhesive member 30 can be smoothly placed on the optical film 500 and the light-emitting diodes 420. Consequently, the display panel 20 is substantially parallel to the light guiding plate 300, and can uniformly receive the light from the backlight module 10.

Since the optical film 500 can be positioned by the light source module 400 without an additional fixing structure, the thickness of the backlight module 10 along the Z-axis can be reduced, so as to facilitate the thinning of the display device.

Figure 4:
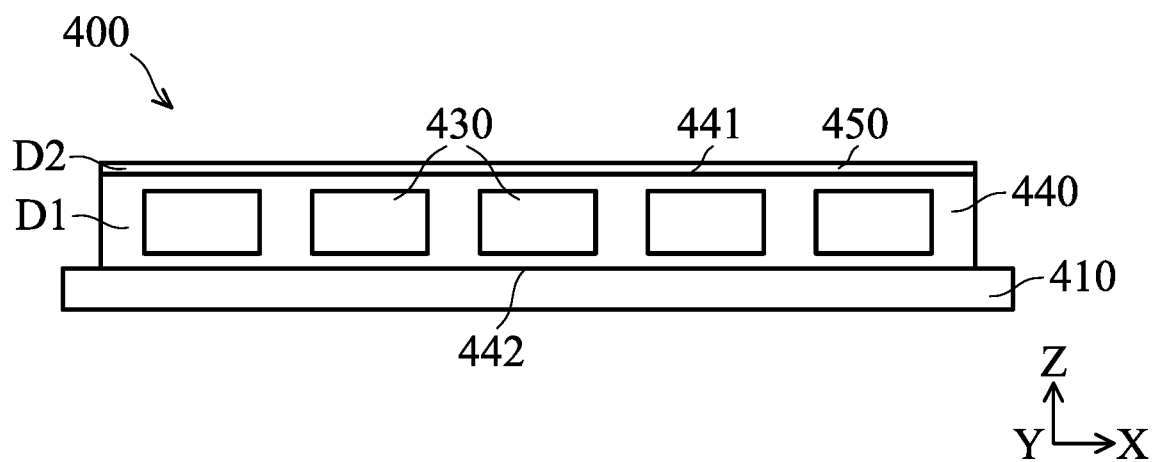
FIG. 4 is a schematic diagram of a light source module according to another embodiment of the invention.
Figure 5:
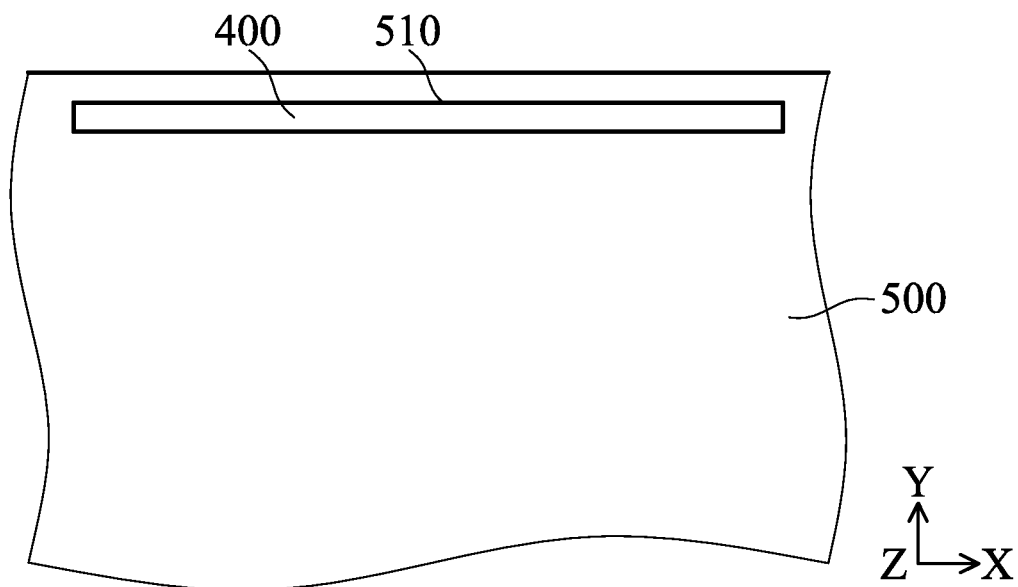
FIG. 5 is a schematic diagram of the light source module accommodated in the accommodating space of the optical film according to another embodiment of the invention.

Referring to FIGS. 4 and 5, in another embodiment, the accommodating space 510 of the optical film 500 is a longitudinal slot, and the light source module 400 comprises a circuit board 410, a plurality of light-emitting chips 430, a package structure 440, and a housing 450. The package structure 400 surrounds and covers the light-emitting chips 430, so as to package the light-emitting chips 430 on the circuit board 410.

The package structure 440 has a light-emitting area D1, a long top side surface 441, and a long bottom side surface 442. The long top side surface 441 and the long bottom side surface 442 are connected to the light-emitting area D1, and the long bottom side surface 442 contacts the circuit board 410 and is opposite to the long top side surface 441. The housing 450 covers the long top side surface 441 and forms a frame area D2.

The longitudinal direction of the longitudinal slot and the longitudinal direction of the light source module 400 are parallel to the X-axis. Similarly, since the lengths of the longitudinal slot along the X-axis and the Y-axis are substantially the same as the lengths of the light source module 400 along the X-axis and the Y-axis, the optical film 500 can be positioned after the light source module 400 enters the accommodating space 510. Furthermore, when the light source module 400 enters the accommodating space 510, at least a portion of the frame area D2 (the housing 450) enters the accommodating space 510, and the light-emitting area D1 (the package structure 440) does not enter the accommodating space 510. Therefore, the waste of the light can be efficiently reduced, and the thinning of the display device can be facilitated.

Figure 6:
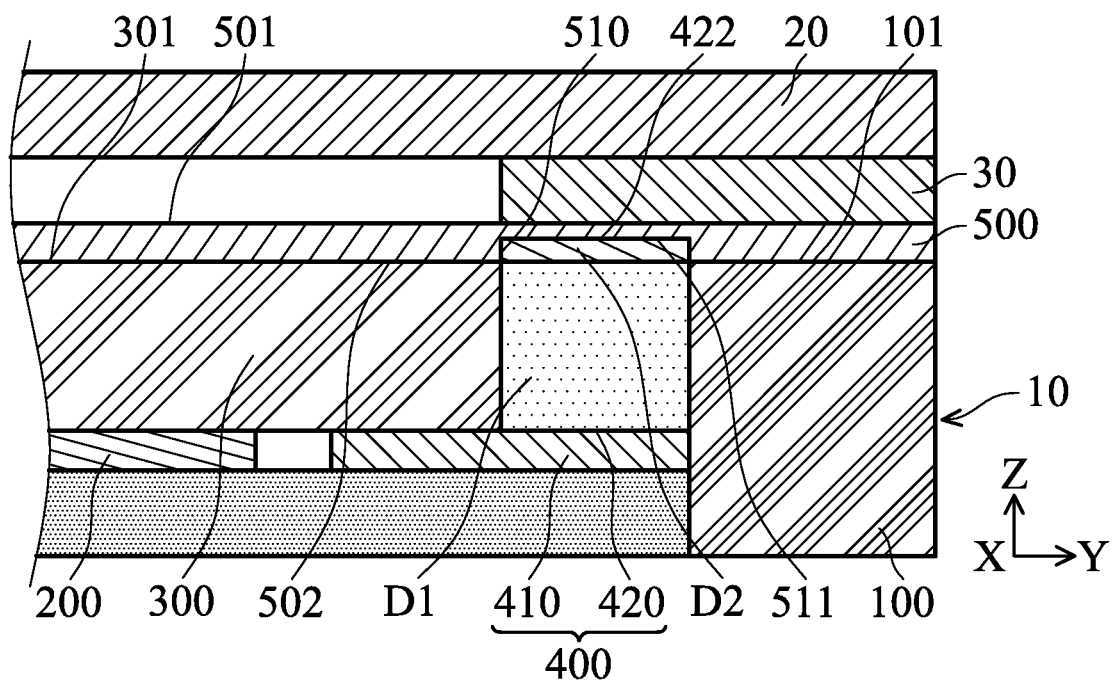
FIG. 6 is a schematic diagram of a display device according to another embodiment of the invention.

As shown in FIG. 6, in another embodiment, the accommodating space 510 of the optical film 500 is a depression on the bottom surface 502 of the optical film 500, and does not extend to the top surface 501 of the optical film 500. Therefore, the accommodating space 510 has a bottom surface 511. When the light source module 400 enters the accommodating space 510 of the optical film 500, the top surface 422 of the frame area D2 contacts the bottom surface 511 of the accommodating space 510.

In summary, a backlight module is provided, including a light guide plate, an optical film, and a light source module. Since the frame area of the light-emitting surface of the light source module is accommodated in the accommodating space of the optical film, it can be positioned. The thinning of the display device can be facilitated, and the loss of the light can be efficiently reduced.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A backlight module, comprising:
   a light guiding plate;
   an optical film, disposed on the light guiding plate, and having an accommodating space; and
   a light source module, having a plurality of light-emitting diodes and at least one light-emitting surface, wherein the light-emitting surface is divided into a light-emitting area and a frame area, the light-emitting area faces the light guiding plate, and at least a portion of the frame area is located within the accommodating space of the optical film while the light-emitting area is located out of the accommodating space of the optical film;
   wherein the plurality of light-emitting diodes emit light only from the light-emitting area to the light guiding plate, and the frame area surrounds the light-emitting area.

2. The backlight module as claimed in claim 1, wherein the accommodating space extends from the top surface to the bottom surface of the optical film.

3. The backlight module as claimed in claim 1, wherein the accommodating space is a depression on the bottom surface of the optical film, and does not extend to the top surface thereof.

4. The backlight module as claimed in claim 1, wherein the light source module has a plurality of light-emitting diodes, and the optical film has a plurality of accommodating spaces at intervals, wherein the accommodating spaces correspond to the light-emitting diodes.

5. The backlight module as claimed in claim 1, wherein the accommodating space of the optical film comprises a longitudinal slot, and the light source module is accommodated in the longitudinal slot.

6. The backlight module as claimed in claim 1, wherein the light-emitting area is disposed in the projection of the light guiding plate on the light-emitting surface.

7. The backlight module as claimed in claim 1, wherein the light source module comprises a circuit board and a plurality of light-emitting diodes, the light-emitting diodes are disposed on the circuit board, and each of the light-emitting diodes has a light-emitting surface.

8. The backlight module as claimed in claim 1, wherein the light source module further comprises a circuit board, a plurality of light-emitting chips, a package structure, and a housing, and the package structure covers the light-emitting chips to package the same on the circuit board, wherein the package structure comprises the light-emitting area of the light-emitting surface, a long top side surface connected to the light-emitting area, and a long bottom side surface connected to the light-emitting area, the housing comprises the frame area of the light-emitting surface, and the frame area covers the long top side surface.

9. The backlight module as claimed in claim 1, wherein the backlight module further comprises a reflective film, and the light guiding plate and the light source module are disposed on the reflective film.

10. A display device, comprising:
    a backlight module as claimed in claim 1;
    an adhesive member, disposed on the light source module; and
    a display panel, disposed on the adhesive member, wherein the optical film is disposed between the display panel and the light guiding plate.

11. The backlight module as claimed in claim 2, wherein each of the light-emitting diodes has a light-emitting surface, and the top surfaces of the frame areas of the light-emitting surfaces are aligned with the top surface of the optical film.

12. The backlight module as claimed in claim 3, wherein each of the light-emitting diodes has a light-emitting surface, and the top surfaces of the frame areas of the light-emitting surfaces contact the bottom surface of the accommodating space.

13. The backlight module as claimed in claim 9, wherein the backlight module further comprises a frame surrounding the reflective film, and the optical film is supported by the frame.

14. The backlight module as claimed in claim 13, wherein the top surface of the frame is aligned with the top surface of the light guiding plate.

15. The display device as claimed in claim 10, wherein the optical film is a diffusion film.

* * * * *